US006013350A

United States Patent [19]

Mizuno

[11] Patent Number: 6,013,350

[45] Date of Patent: Jan. 11, 2000

[54] BUILDING PANEL, AND METHOD AND APPARATUS FOR COATING THE BUILDING PANEL

[75] Inventor: Daizo Mizuno, Aichi, Japan

[73] Assignee: Nichiha Corporation, Aichi, Japan

[21] Appl. No.: 08/994,654

[22] Filed: Dec. 19, 1997

[30] Foreign Application Priority Data

Aug. 29, 1997 [JP] Japan .................................... 9-234996

[51] Int. Cl.$^{7}$ ................................ B32B 3/00; B05D 1/36; B05B 7/00

[52] U.S. Cl. .......................... 428/172; 428/105; 428/141; 428/143; 428/156; 428/161; 428/173; 428/207; 428/212; 427/258; 427/262; 427/265; 427/280; 427/402; 427/421; 118/300; 118/313

[58] Field of Search .................................... 428/172, 195, 428/210, 207, 105, 114, 141, 143, 156, 161, 173, 201, 212, 213, 187; 52/311.1, 316, 782.1; 118/300, 313; 427/258, 262, 265, 280, 402, 421, 419.2

[56] References Cited

U.S. PATENT DOCUMENTS 5,270,097 12/1993 Amemiya et al. ....................... 428/156
5,709,918 1/1998 Kimijima et al. ..................... 428/40.1

*Primary Examiner*—Donald Loney
*Attorney, Agent, or Firm*—Pillsbury Madison & Sutro LLP

[57] ABSTRACT

A building panel having a three-dimensionally patterned surface, and a method and apparatus for coating the building panel are disclosed. The building panel includes convex portions partially topcoated with a first coating, concave portions partially topcoated with a second coating which is different in color from the first coating, and between the concave and convex portions topcoated with a third coating which is different in color from the first and second coatings. The third coating layer topcoated over the intermediate portions is preferably darker in color than the first coating so as to emphasize the depth of the concave portions and hence the stereographic appearance.

17 Claims, 17 Drawing Sheets

| | | | | | | | | | | | | | | | |
|---|---|---|---|---|---|---|---|---|---|---|---|---|---|---|---|
| P1 | P3 | P5 | P1 | P1 | P4 | P3 | P3 | P3 | P5 | P5 | P1 | P2 | P3 | P5 | P5 |
| P1 | P3 | P5 | P1 | P1 | P2 | P3 | P3 | P5 | P5 | P5 | P1 | P4 | P3 | P5 | P1 |
| P1 | P3 | P3 | P3 | P1 | P3 | P5 | P1 | P2 | P3 | P3 | P1 | P4 | P3 | P5 | P1 |
| P1 | P1 | P2 | P3 | P5 | P5 | P5 | P1 | P1 | P3 | P3 | P1 | P3 | P5 | P5 | P1 |

| | | | | | | | | | | | | | | | | |
|---|---|---|---|---|---|---|---|---|---|---|---|---|---|---|---|---|
| G1 → | A1 | A3 | D5 | B1 | A1 | A4 | A3 | A3 | C3 | C5 | D5 | B1 | A2 | C3 | D5 | D5 |
| G2 → | B1 | B3 | D5 | C1 | A1 | A2 | A3 | C3 | D5 | D5 | D5 | A1 | A4 | B3 | D5 | A1 |
| G3 → | C1 | C3 | C3 | C3 | C1 | B3 | C5 | A1 | A2 | A3 | A3 | A1 | A4 | C3 | D5 | A1 |
| G4 → | C1 | B1 | A2 | A3 | D5 | D5 | D5 | B1 | A1 | A3 | A3 | B1 | A3 | C5 | D5 | B1 |

BUILDING PANEL, AND METHOD AND APPARATUS FOR COATING THE BUILDING PANEL

BACKGROUND OF THE INVENTION

1. Field of the Invention

This invention relates to a building panel and to the method and apparatus for applying a coating to the building panel, and in particular to a building panel having a three-dimensionally patterned surface, which is enhanced in stereographic feeling through an application of shadow coating thereto. This invention also relates to a method and apparatus for applying a coating to such a three-dimensionally patterned surface of building panel.

2. Description of the Related Art

As shown in FIG. 17, in the case of a building panel 1 (inclusive of a plate, a board and the like which are usually employed as a building material) having a three-dimensional feature such as a tile-like pattern, a dark color coating is usually applied to the joint portions (groove portions) 3, i.e. the concave portions, while a light color is applied to the surfaces 70 of the convex portions (design portions) 4, whereby enhancing the stereographic feeling, i.e. by a difference in color between the convex portions 4 and the joint portions 3. As for the coating method to be typically employed in this case, a method is adopted wherein the entire surface of the building panel is coated at first in a dark color selected especially for the joint portions by means of spray method, and, after this coated layer is dried, the convex portions 4 are selectively coated in a light color by means of roller coating method.

Japanese Patent Publication H/6-98338 discloses a method of coating a building panel having a three-dimensionally patterned surface, wherein a spotty pattern is formed on the three-dimensionally patterned surface by jetting a coating material from a spray gun, thereby bringing about a color change between the concave portions and the convex portions.

Japanese Patent Publication H/7-22735 discloses a method of coating a building panel having a three-dimensionally patterned surface which is imitated to the surface of a natural stone, wherein a base coat, a first image coat, a second image coat and a top coat are successively applied to the three-dimensionally patterned surface, thereby obtaining a building panel having a surface of granite image.

Japanese Patent Unexamined Publication S/63-35471 discloses a method of coating a building panel having a three-dimensionally patterned tile-like surface, wherein the panel being moved on a conveyer is stopped moving for a while, during which a dark color paint is sprayed from four sides onto the surface of the panel, and after the coating of a light color paint is dried while continuously moving the conveyer, only the surface of convex portions of the panel is coated again with a light color paint by means of a roll coater.

Since the three-dimensionally patterned surface of building panel is simply coated by means of a spray gun or a roller coater according to the aforementioned conventional techniques, the sloped portions forming the concave (joint portion) is colored in the same color that is applied to the bottom portions of the concave portions. As a result, the color coated on the concave portions is made quite distinct from the color coated on the convex portions, thus failing to attain a natural stereographic feeling.

Namely, since a light color paint is coated only on the surfaces 70 of the convex portions 4, these surface portions 70 coated with light color appear as if they are covered respectively with a cap particularly when they are viewed perspectively. Therefore, these conventional coating methods explained above are incapable of attaining a natural stereographic feeling and are not preferable also in view of design.

BRIEF SUMMARY OF THE INVENTION

This invention has been made under the circumstances mentioned above, and therefore, an object of the present invention is to provide a building panel having a three-dimensionally patterned surface, which is enhanced in depth and stereographic feeling. Another object of this invention is to provide a method and apparatus for applying such a coating to the three-dimensionally patterned surface of building panel.

Namely, this invention provides a building panel having a three-dimensionally patterned surface comprising convex portions and concave portions, wherein said convex portions are partially topcoated with a first coating, said concave portions are partially topcoated with a second coating which is different in color from said first coating, and intermediate portions between said convex portions and said concave portions are topcoated with a third coating which is different in color from said first coating and from said second coating.

The third coating should preferably be darker in color than the first coating so as to emphasize the depth of the concave portions and hence to enhance stereographic feeling.

It is also preferable to distribute at least two kinds of grains, each differing in size, on the three-dimensionally patterned surface if stone-like surface features are to be emphasized.

This invention further provides a method of applying a coating to a three-dimensionally patterned surface of building panel comprising convex portions and concave portions. This method comprises first entirely coating the three-dimensionally patterned surface with a first color. Second, the convex portions are coated with a second color which is different in color from the first coating. Third, intermediate portions between the convex portions and the concave portions are spray-coated with a third color which is different in color from the first coating and from said second coating, the spray-coating is performed in conformity with a shape of the concave portions.

The aforementioned third step should preferably be performed at a moment when the coating applied at the second step is still in a semi-dried condition, thereby improving a fixing between the coating of the second step and the coating of the third step.

It is also preferable that the third step is followed by a fourth step wherein at least two kinds of grains, each differing in size, are separately spread on the three-dimensionally patterned surface, if stone-like surface features are to be emphasized.

When at least two kinds of grains are separately spread on the three-dimensionally patterned surface as mentioned above, it is preferable, in view of improving the stability (as a whole) of the grains applied, that smaller grains are spread at first on the surface before the spreading of larger grains is performed.

The apparatus for applying such a coating to the three-dimensionally patterned surface of building panel is featured in that it is provided with a jet controller for controlling the jet from a spray gun in conformity with the shape of the three-dimensionally patterned surface.

Namely, this invention provides an apparatus for applying a coating to a three-dimensionally patterned surface of a building panel, which comprises a plurality of spray guns, the spraying direction of which can be altered different from one another; a spray gun selection means for determining the spray guns to be employed by taking the shape of the surface of building panel into consideration; a jet rate-determining means for determining the jet rate of coating material to be injected from the spray guns by taking the shape of the surface of building panel into consideration; and a coating means for performing a coating of the building panel at a jet rate determined and by making use of the spray guns selected.

The spray gun selection means should preferably be provided with an inclination pattern-determining means for transforming the inclination of each of small sections into a pattern; the small sections are formed in advance by partitioning building panel into a predetermined number along the longitudinal and crosswise directions. The determination of the spray guns to be employed is performed on the basis of the inclination pattern determined by the inclination pattern-determining means. It is possible with the provision of this inclination pattern-determining means to enhance the stereographic feeling without necessitating an extremely delicate jet control.

The jet rate-determining means should preferably be provided with an area ratio pattern-determining means for transforming the area ratio of the concave portions in each of small sections into a pattern. The small sections being formed in advance by partitioning the building panel into a predetermined number along the longitudinal and crosswise directions of the building panel. The jet rate of the spray guns is determined on the basis of the area ratio pattern determined by the area ratio pattern-determining means. It is possible with the provision of this area ratio pattern-determining means to enhance the stereographic feeling without necessitating an extremely delicate jet control.

The inclination pattern-determining means should preferably be designed such that the small section is scanned at first by a predetermined number of scanning lines which are allowed to run along the longitudinal direction of the building panel thereby to measure a distance between a highest level among the convex portions to the surface of building panel, and the inclination pattern in each small section is determined based on data of the distance measured.

This determining method is preferable since it is capable of precisely determining the inclination pattern.

The area ratio pattern-determining means should preferably be designed such that a reduced two-dimensional black-and-white image of the building panel which is obtained by photographing is scanned at first by an optical reader and then converted into pixels, and a ratio of the number of black pixels representing the concave portions in relative to the total number of pixels representing the small section is determined by an image processing, thus determining the area ratio pattern in each small section. This determining method is preferable since it is capable of precisely determining the area ratio pattern without employing complicated procedures. The coating means for coating the building panel is constructed such that the inclination pattern and area ratio pattern which have been determined to the group of small sections partitioned successively along the longitudinal direction of the building panel are at first processed so as to convert them into the information representing the changes in jet rate with time and the changes in coating material-jetting time of the spray guns selected to be employed, and the coating of the building panel by the coating means is carried out based on the information thus processed. The coating means constructed in this manner can be controlled in conformity with the characteristics thereof.

DETAILED DESCRIPTION OF THE INVENTION

Preferred examples of this invention will be further explained in details with reference to the drawings.

Figure 1:
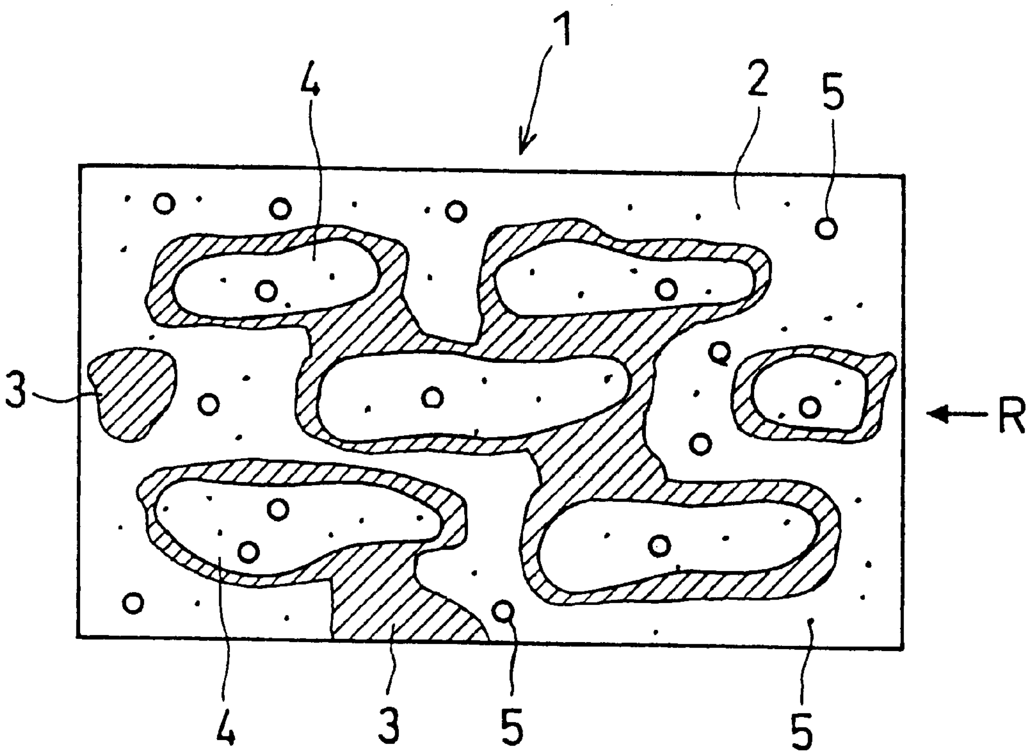
FIG. 1 is a schematic plan view showing a building panel of this invention.
Figure 2:
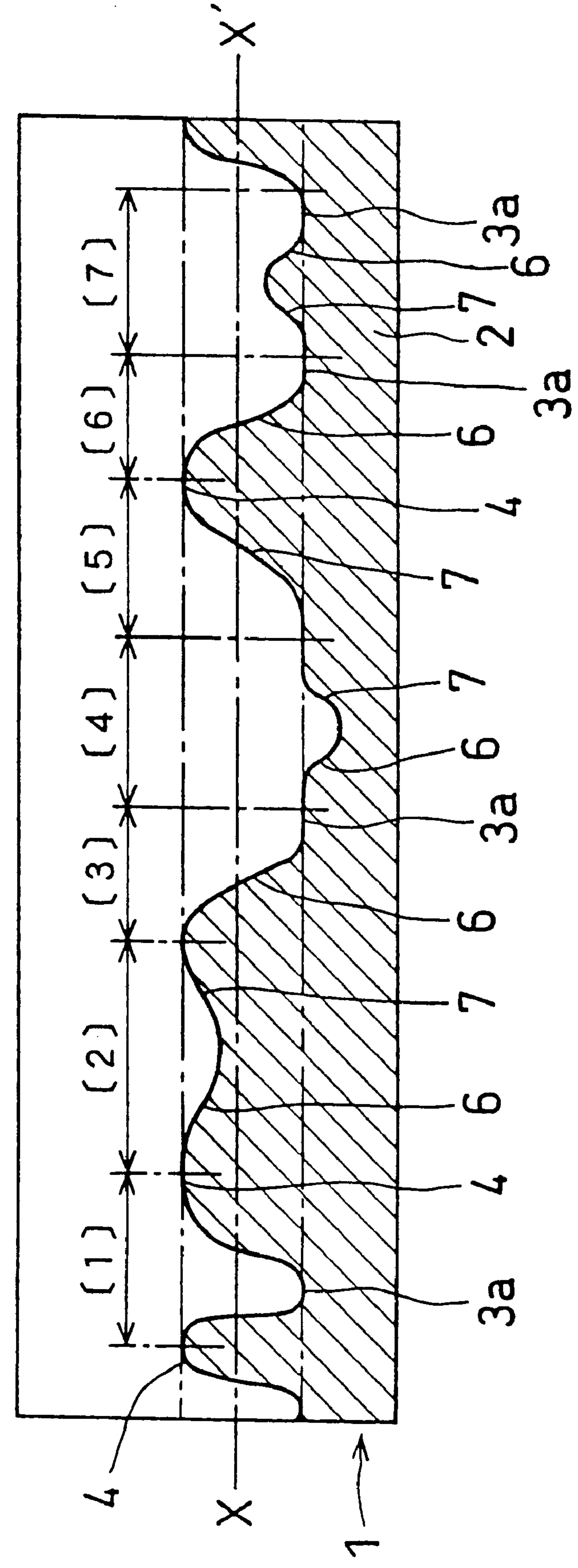
FIG. 2 is a schematic cross-sectional view illustrating the concave portions of a building panel.

FIG. 1 shows a schematic plan view of the surface of a building panel according to this invention, and FIG. 2 shows a schematic cross-sectional view illustrating the features of concave portions of a building panel.

Referring these FIGS. 1 and 2, the surface of substrate 2 of a building panel 1 is provided with a three-dimensional pattern, i.e. concave portions 3 (the portions hatched) and convex portions 4 (flat portions in this case). In this case, a unique coating (i.e. a stereographic coating to be illustrated hereinafter) is applied to the concave portions 3 so as to enhance the stereographic feeling thereof. Further, two kinds of beads, i.e. large beads and small beads, are distributed all over the surface of the building panel 1 so as to enhance the stone-like surface features of the panel 1.

As shown in FIG. 2, the concave portions in particular are formed irregularly, thereby expressing the following seven kinds of patterns (1) to (7) in this case.

(1) convex portion 4→bottom portion 3*a*→convex portion 4;

(2) convex portion 4→downward inclination 6→upward inclination 7→convex portion 4;

(3) convex portion 4→downward inclination 6→bottom portion 3*a;*

(4) bottom portion 3*a*→downward inclination 6→upward inclination 7→bottom portion 3*a;*

(5) bottom portion 3*a*→convex portion 4;

(6) convex portion 4→bottom portion 3*a;*

(7) bottom portion 3*a*→upward inclination 7→downward inclination 6→bottom portion 3*a*.

Figure 3:
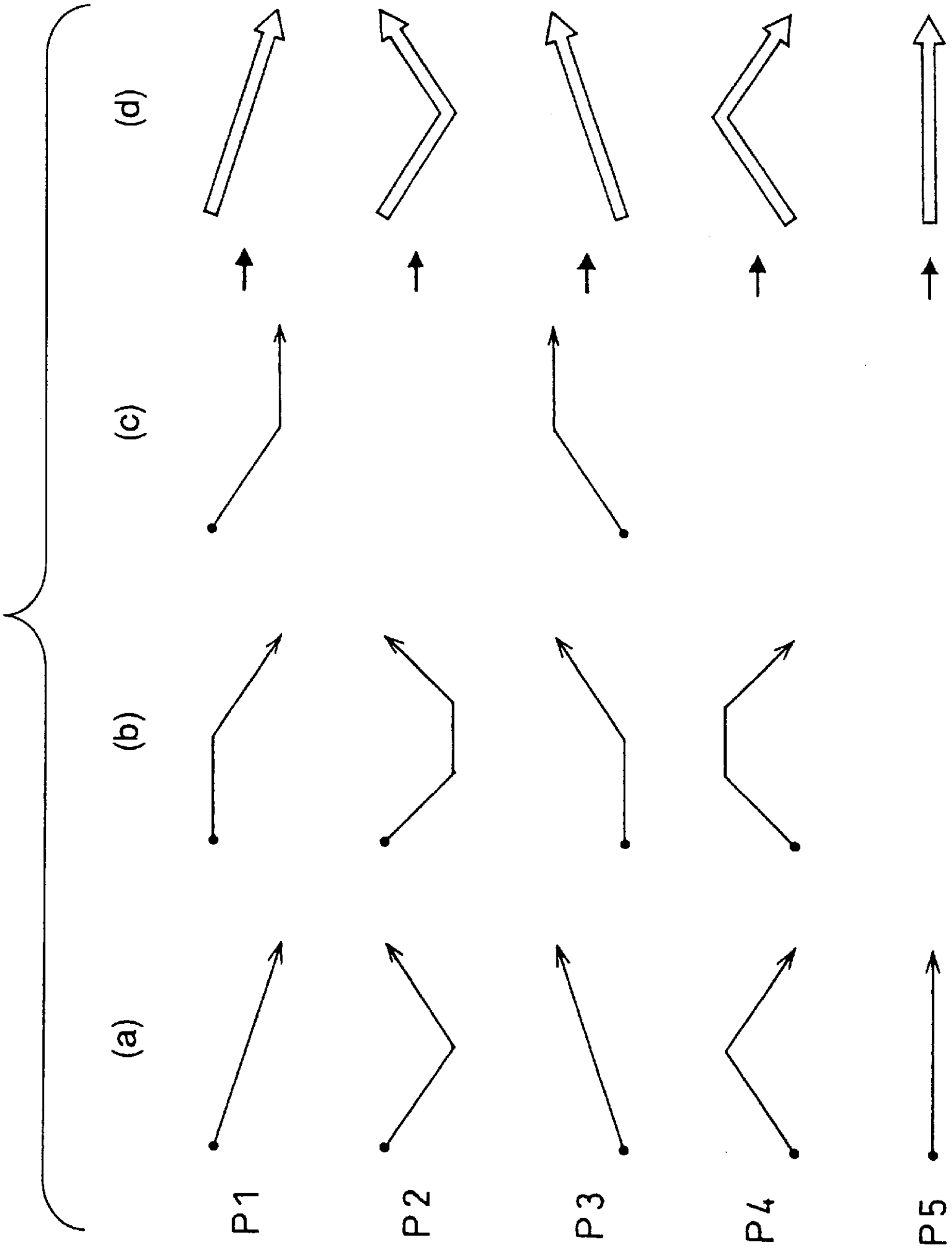
FIG. 3 is a diagram illustrating the classification of inclination patterns of the portions which are disposed higher than the line X–X' of FIG. 2.

In this case, the peripheral inclined portions (where a stereographic coating is to be applied to as explained hereinafter) of the convex portions 4, which are disposed higher than the line X–X' of FIG. 2, are classified according to the patterns of inclination as shown in FIG. 3, by observing the changes in inclination of these inclined portions from the downstream side of the transferring direction (the direction indicated by R in FIG. 1) of the building panel 1.

Referring to FIG. 3, although the inclination pattern P1 is actually constituted by three kinds of patterns, i.e. (a) a downward inclination, (b) a flat portion→a downward inclination, and (c) a downward inclination→a flat portion, these patterns are put together and symbolized as (d) a simple downward inclination pattern. Although the inclination pattern P2 is actually constituted by two kinds of patterns, i.e. (a) a downward inclination→an upward inclination, and (b) a downward inclination→a flat portion→an upward inclination, these patterns are put together and symbolized as (d) a bent upward inclination pattern. Although the inclination pattern P3 is actually constituted by three kinds of patterns, i.e. (a) a upward inclination, (b) a flat portion→an upward inclination, and (c) an upward inclination→a flat portion, these patterns are put together and symbolized as (d) a simple upward inclination pattern. Although the inclination pattern P4 is actually constituted by two kinds of patterns, i.e. (a) an upward inclination→a downward inclination, and (b) an upward inclination→a flat portion→a downward inclination, these patterns are put together and symbolized as (d) a bent downward inclination pattern. Since the inclination pattern P5 is constituted only by a flat portion, it is symbolized as (d) a inclination-free pattern.

Figures 4A, 4B:
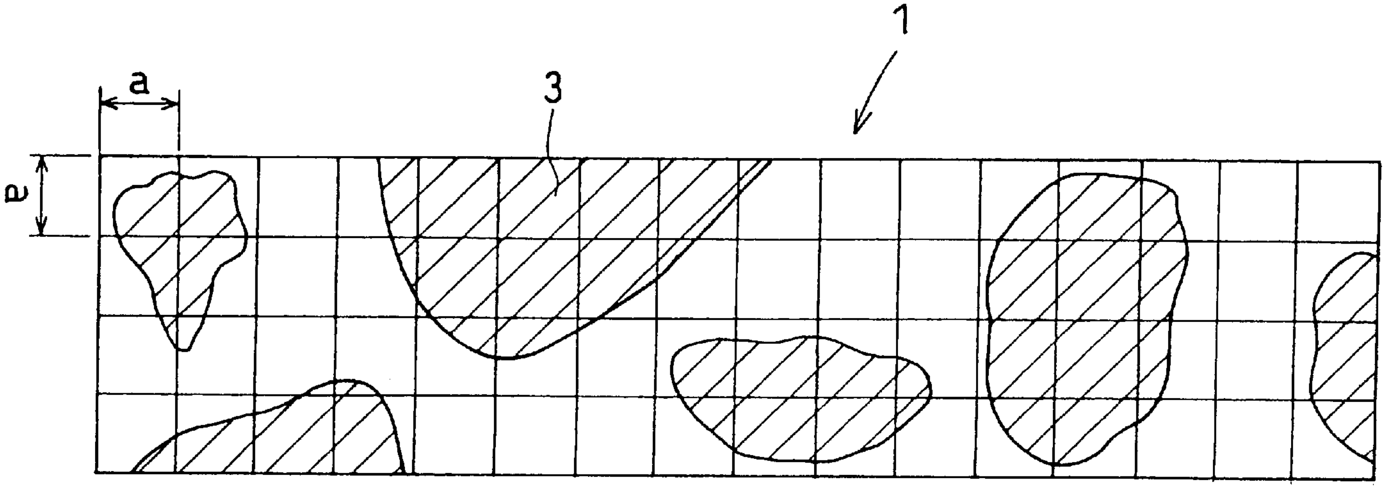
FIG. 4 shows diagrams illustrating a method of obtaining inclination patterns, wherein FIG. 4(*a*) illustrates an example of the concave portions of a building panel, and FIG. 4(*b*) illustrates an example of patternings of the building panel.
Figures 5A, 5B:
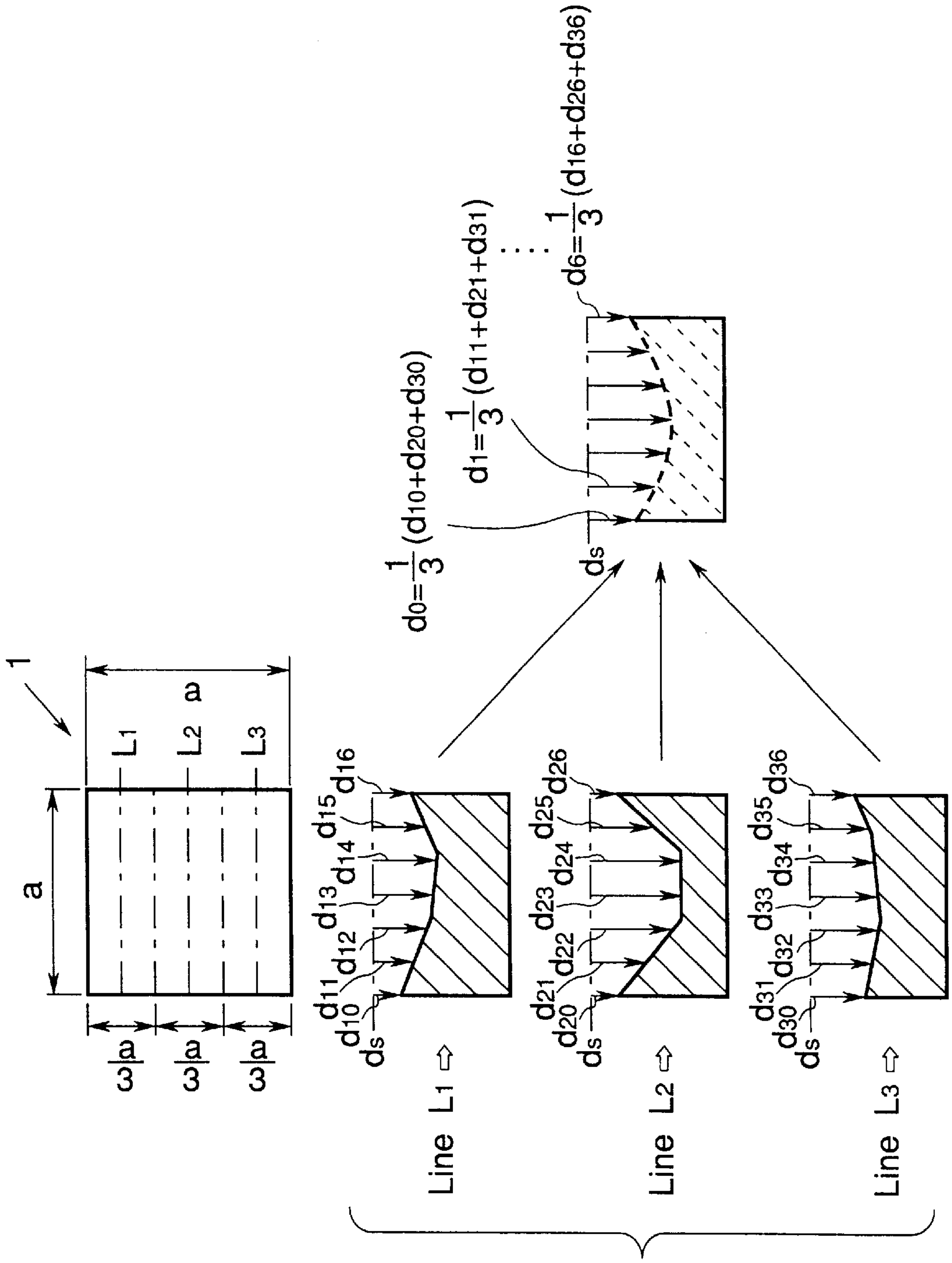
FIG. 5 shows diagrams illustrating a method of determining the inclination pattern of a small section, wherein FIG. 5(*a*) is a plan view and FIG. 5(*b*) is a cross-sectional view.

FIG. 4 illustrates one example of a building panel which is represented by the inclination patterns formulated according to the aforementioned method. FIG. 5 illustrates a method of transforming the inclinations of a concave portion into a pattern.

First of all, as shown in FIG. 4(*a*), the building panel 1 is virtually partitioned thereby supposedly forming a sequence of small sections extending along the longitudinal direction of the building panel, each small section being square ("a"×"a") in shape. Subsequently, as shown in FIG. 5(*a*), each square section is partitioned along the transferring direction of the building panel 1 into three equal parts, and then a sampling of depth data from each of these three rectangular parts is performed along each center line, i.e. L1, L2 and L3, which is taken along the longitudinal direction of each rectangular part.

Specifically, the depth data of each concave portion, i.e. d0, d1, d2, - - - d6, are sampled from each center line with a predetermined sampling velocity and within a predetermined period of time required for passing the distance "a". In this case, the depth data of the concave portion is determined by the magnitude of displacement di as measured from a designed maximum thickness ds of the convex portions of the building panel. Then, a set of depth data {di}={d0, d1, d2, - - - d6} representing the depth of a small section is determined by a simple arithmetical mean calculated based on the depth data taken from each center line. The measurement of the depth data can be performed by making use of a displacement sensor for example.

The inclination pattern of the concave portion is then determined from this set of depth data. Namely;

If the difference is {(di+1)−di}≦0, the inclination pattern is determined as P3:

If the difference is {(di+1)−di}≧0, the inclination pattern is determined as P1:

If the difference {(di+1)−di} indicates a change in sign from ≦0 to ≧0, the inclination pattern is determined as P4:

If the difference {(di+1)−di} indicates a change in sign from ≧0 to ≦0, the inclination pattern is determined as P2: and If the difference {(di+1)−di}=0 is repeated in a predetermined number of times, the inclination pattern is determined as P5.

Based on these inclination patterns (P1 to P5) determined in this manner, the jet angle of each spray nozzle at the occasion of stereographic coating is determined as explained hereinafter.

The hatched portions in FIG. 4(*a*) denote concave portions 3, and FIG. 4(*b*) denotes the inclination patterns of the aforementioned virtually partitioned portions, which are represented by the inclination patterns of P1 to P5 shown in FIG. 3.

Figure 6:
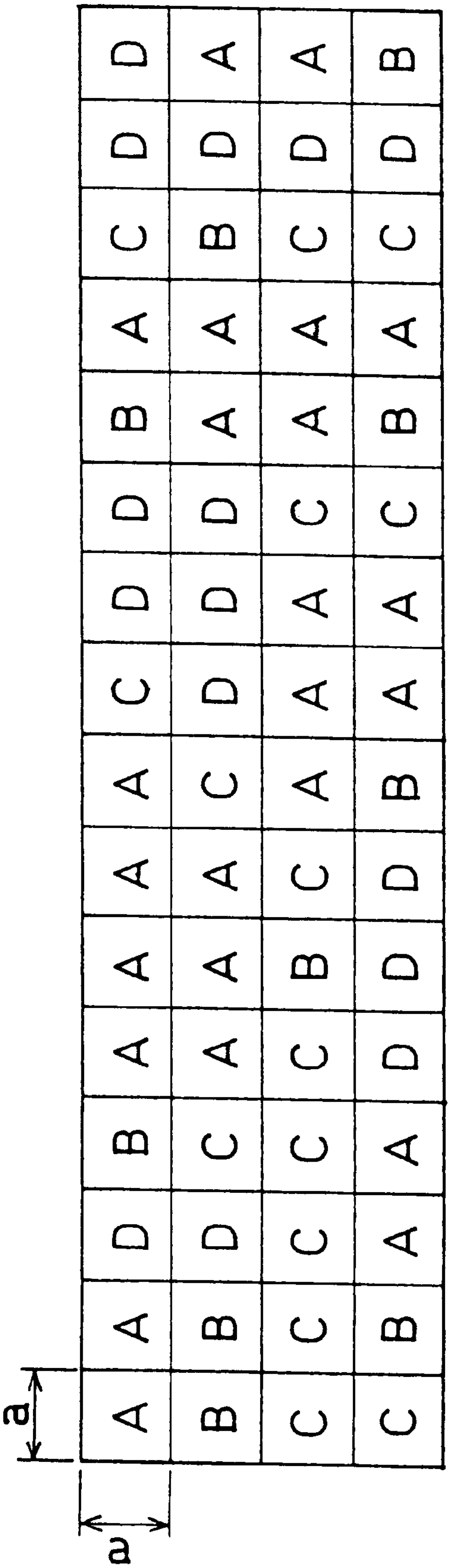
FIG. 6 is a diagram illustrating a method of area ratio patternings.
Figures 7A, 7B, 7C:
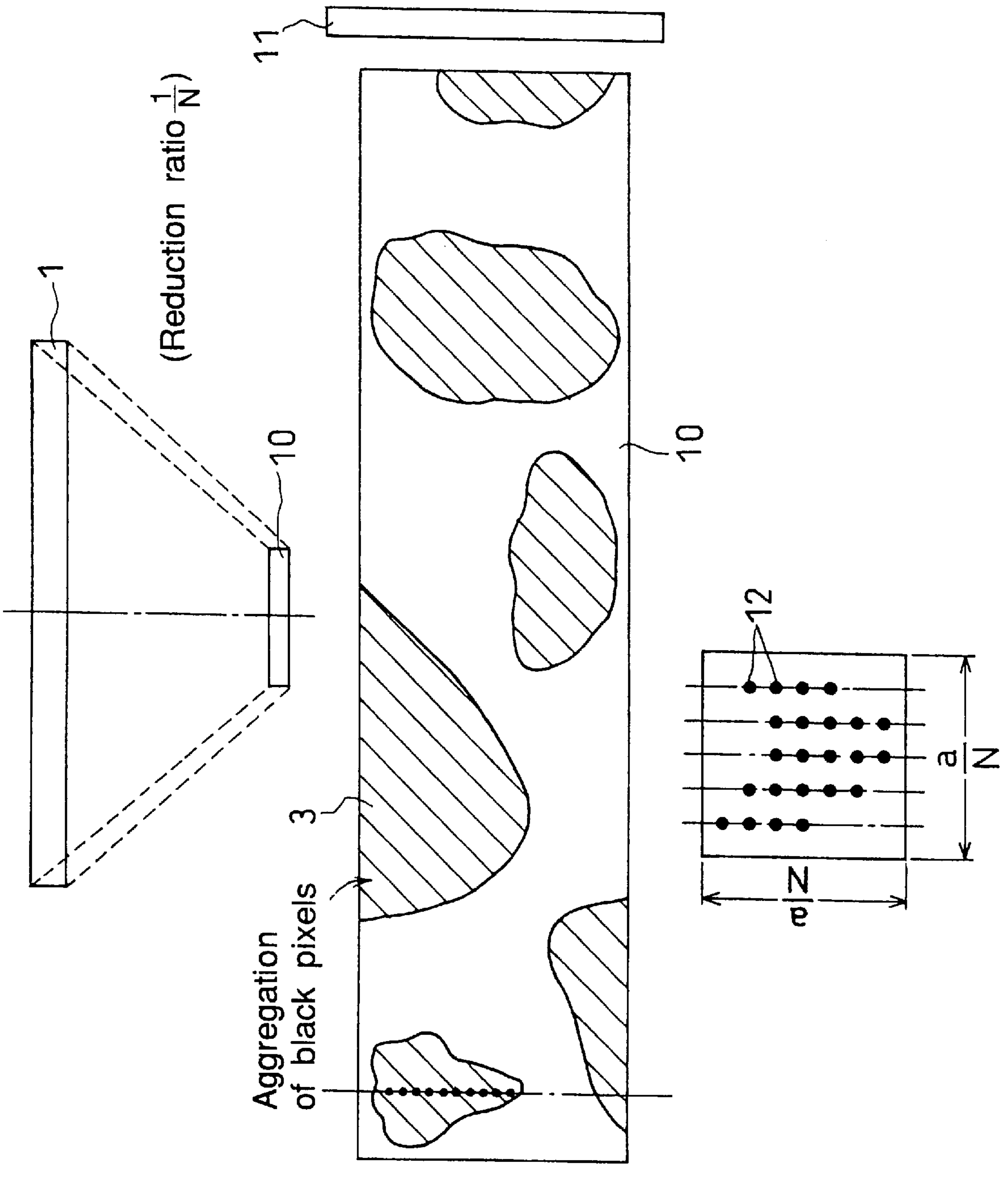
FIG. 7 shows diagrams illustrating a method of determining area ratio patterns by means of image processing, wherein FIG. 7(*a*) shows a method of obtaining a reduced image, FIG. 7(*b*) shows a method of reading the reduced image and FIG. 7(*c*) shows a black pixels in one section.

FIG. 6 illustrates one example of a building panel which is represented by the patterns of the area ratio of the concave portion 3. FIG. 7 illustrates a method of transforming the area ratio of a concave portion into a pattern by means of an image processing technique.

Referring to FIG. 7, a reduced scale image 10 of the building panel 1 (a black-white image, 1/N in reduction ratio or scale) is taken at first by making use of a camera (not shown) as shown in FIG. 7(*a*). Then, as shown in FIG. 7(*b*), the reduced scale image 10 of the building panel 1 is transferred to an optical scanning head 11, with which the number of black pixels (the set of the pixels corresponds to the concave portion 3) that have been detected on the scanning lines of the optical scanning head 11 are integrated in each small section as shown in FIG. 7(*c*). Then, based on the results thus obtained, the area ratio (%) of the concave portion 3 is calculated by the following formula. The total pixel number within a single small section of the reduced scale (a square, the dimension of one side thereof being a/N) is determined according to the resolution of an image reader.

Area ratio=(the number of black pixels/total number of pixels)×100

The area ratio determined in this manner is converted into a pattern, thereby obtaining the example shown in FIG. 6.

In FIG. 6, “A” represents where the area ratio of the concave portion 3 is more than 3/4 in a single small section (“a”×“a”); “B” represents where the area ratio of the concave portion 3 is 1/4 to 3/4; “C” represents where the area ratio of the concave portion 3 is less than 1/4; and “D” represents where the area ratio of the concave portion 3 is zero (constituted by only the convex portions).

Based on these area ratio patterns determined in this manner, the magnitude of jet (the quantity of coating material) of each spray nozzle at the occasion of stereographic coating is determined as explained hereinafter.

Figure 8:
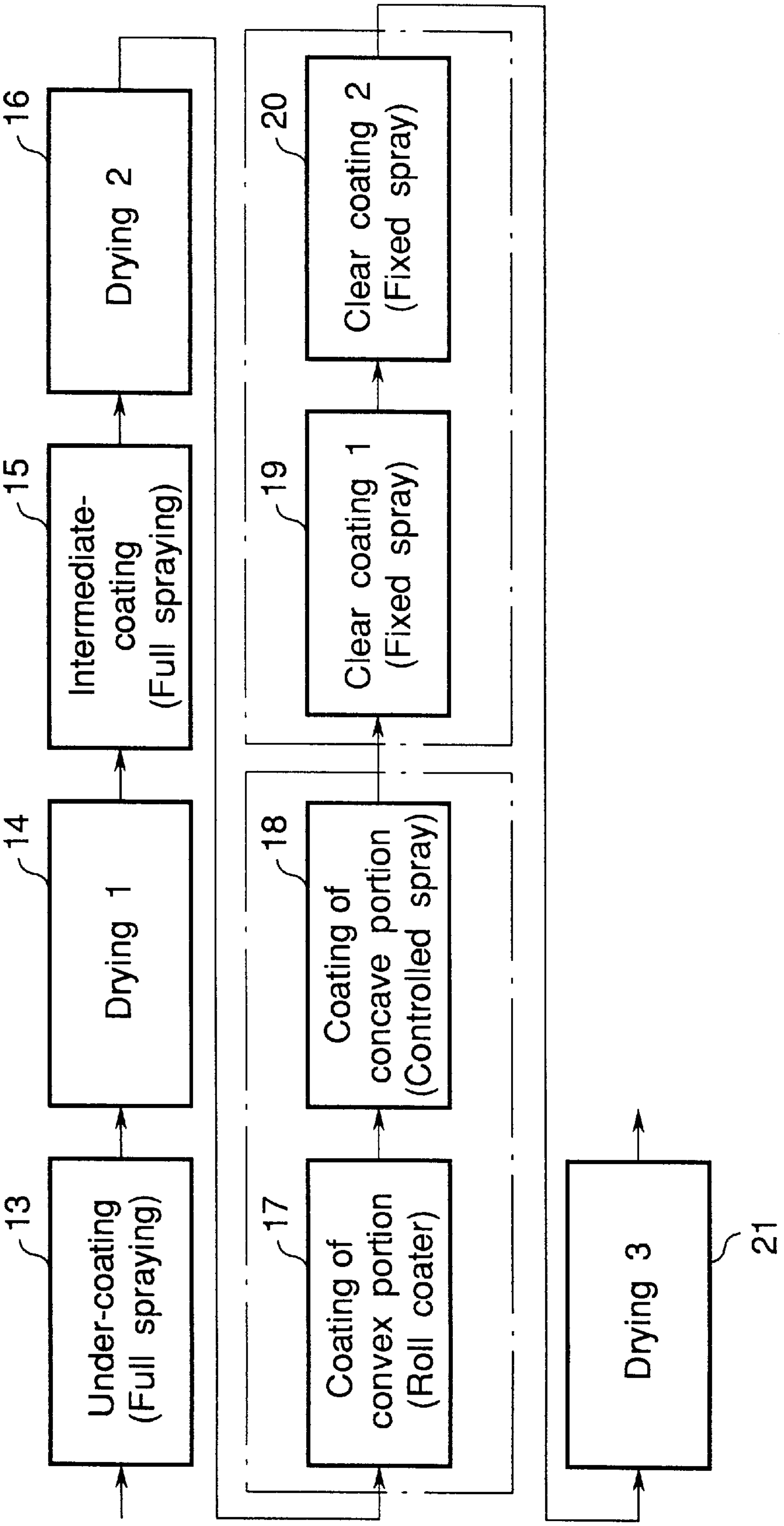
FIG. 8 is a block diagram showing coating steps for coating a building panel by a coating apparatus according to this invention.

FIG. 8 illustrates the coating steps of a building panel by a coating apparatus according to this invention. The reference number 13 denotes an under-coating step wherein a sealer coating, etc. is applied all over the surface of the building panel by means of spray; likewise, 14 denotes a first drying step; 15 denotes an intermediate coating step wherein a spray coating is applied to all over the surface of the building panel; and 16 denotes a second drying step. The reference numbers 17 and 18 denote the coating steps which constitute the main features of this invention. Namely, 17 denotes a coating step for performing the coating of the convex portions, and 18 denotes a coating step for performing the coating of the concave portions. In the coating step 17 of the convex portions, a quick-drying paint (coating material) is coated on the surface of a building panel by means of a roller coater. In the coating step 18 of the concave portions, a paint which is similar in hue to, but somewhat lower in brightness (i.e. darker in color) than that employed in coating the convex portions 4 is employed and coated according to the features in shape of the concave portions 3, i.e. according to the aforementioned inclination patterns (see FIG. 4) and area ratio patterns (see FIG. 6) by means of a controlled spray coating.

The reference number 19 denotes a first clear coating which can be applied by means of a fixed spraying. For example, a fluorine plastic clear paint containing plastic beads having a particle diameter of about 120 μm is coated on the surface of a building panel. Likewise, the reference number 20 denotes a second clear coating which can be applied by means of a fixed spraying. For example, a fluorine plastic clear paint containing plastic beads having a particle diameter of about 2,000 μm is coated on the surface of a building panel. The purpose of performing these first and second clear coatings is to improve the weather resistance of the building panel and at the same time to enhance the stone-like surface features of the building panel, and hence these coatings may be omitted if so desired. Finally, the coated layers are subjected to a third drying step 21 so as to accomplish the building panel.

Figure 9:
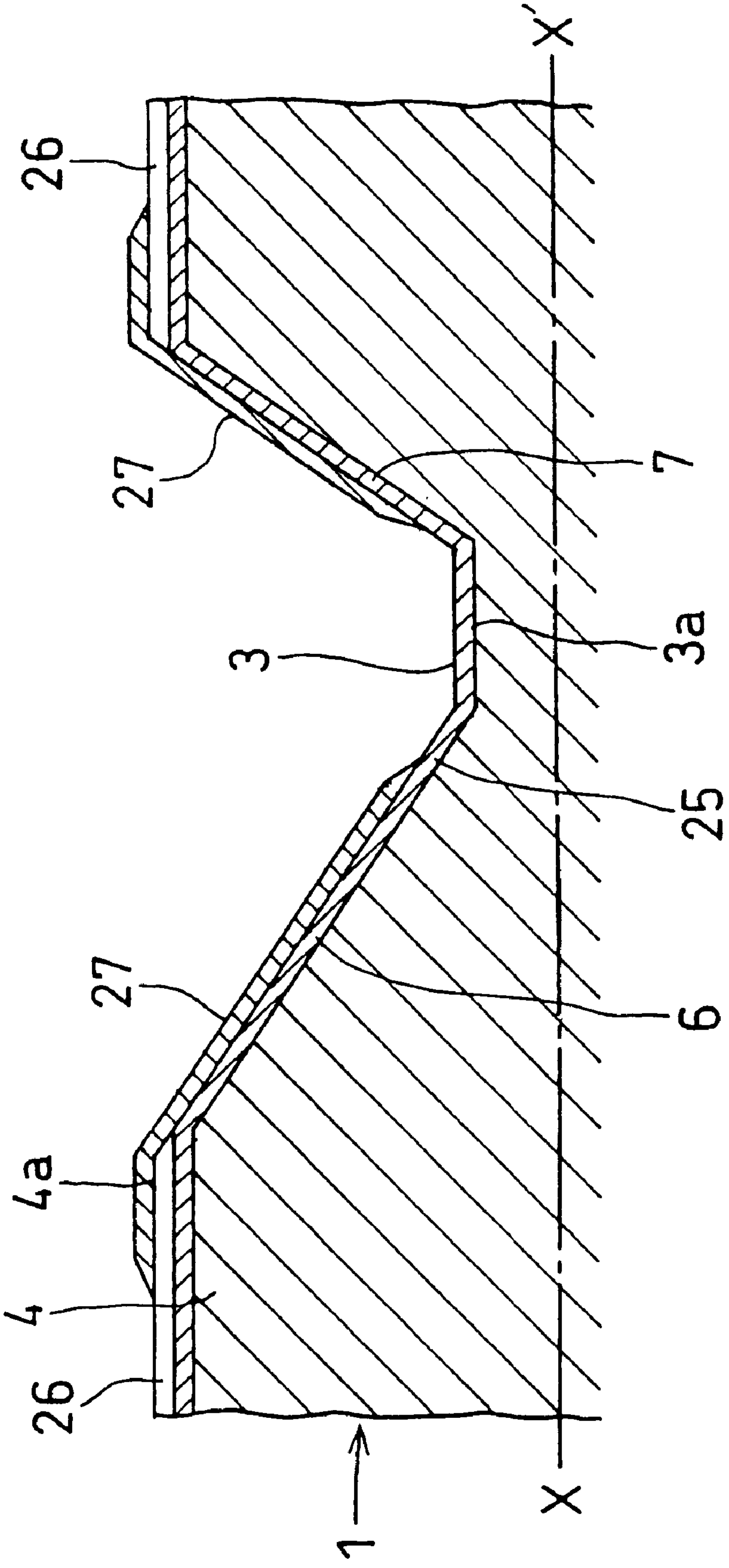
FIG. 9 is a cross-sectional view showing a main portion of a building panel according to this invention.

FIG. 9 shows a cross-sectional view schematically illustrating the structure of the concave portion of a building panel according to this invention, wherein an intermediate coating 25 is coated in advance at the intermediate coating step 15 as shown in FIG. 8, and then a convex-coating 26 is selectively applied by means of a roller coater only on the portions of intermediate coating 25 where the convex portions 4 are located (the convex portion-coating step 17). Furthermore, an inclination-coating 27 is selectively coated on the intermediate coating 25. Namely, the inclination-coating 27 is applied only to the peripheral portion 4*a* of the convex-coating 26 and to part of the inclined portion neighboring to the peripheral portion 4*a*, i.e. a portion of the downward inclination 6 as well as a portion of the upward inclination 7. In other words, the inclination-coating 27 is partially overlapped with the peripheral portion 4*a* of the convex portion 4 and extended therefrom to an intermediate portion of the downward inclination 6 and of the upward inclination 7, thus leaving the bottom portion 3*a* of the concave portion 3 uncoated with the inclination-coating 27. In this case, as mentioned above, the color of the inclination-coating 27 is selected to be somewhat darker than the color of the convex-coating 26.

Figure 10:
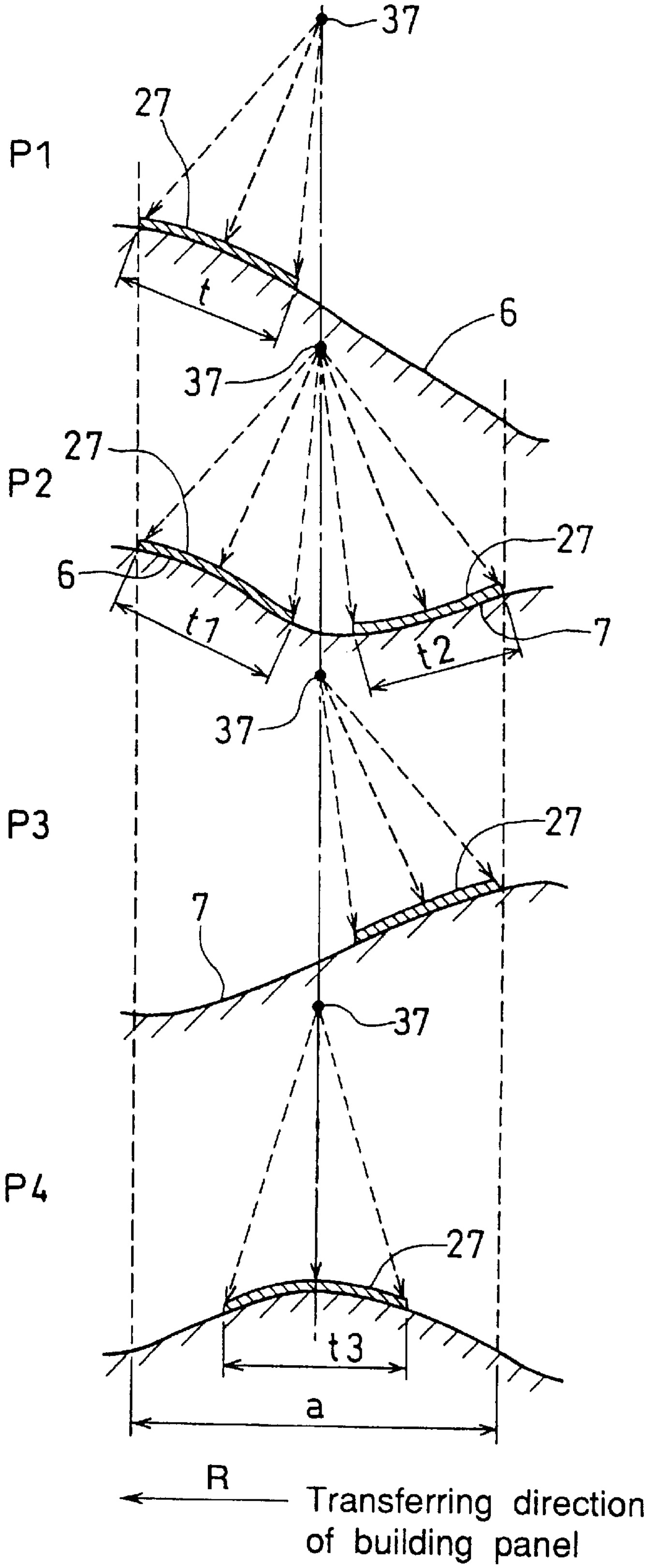
FIG. 10 is a diagram illustrating a coating means which is capable of coating in conformity with an inclination pattern.

FIG. 10 shows a specific example of a controlled spray coating which is to be performed in conformity with each inclination pattern, P1, P2, P3 and P4 (since P5 is inclination-free, coating is not performed) of the concave portions 3.

In the case of the inclination pattern P1, a paint is ejected from the nozzle 37 (to be explained hereinafter) of spray coater toward the downward inclination 6 with a width of “t” before and behind from the direction orthogonal to the downward inclination 6, thereby forming the inclination coating 27. The width “t” of the inclination coating 27 should preferably be limited to ½ to ⅔ of the length of the downward inclination 6.

In the case of the inclination pattern P2, a paint is ejected from a couple of nozzles 37, each directed toward different inclination surfaces, i.e. the downward inclination 6 and the upward inclination 7, with widths of “t1” and “t2” before and behind from the directions orthogonal respectively to the downward inclination 6 and the upward inclination 7, thereby forming the inclination coating 27.

In the case of the inclination pattern P3, the coating of the inclination coating 27 is performed in the same manner as in the case of the inclination pattern P1 except that the inclination direction in this case is opposite to that of the inclination pattern P1, i.e. the coating is applied to the upward inclination 7.

In the case of the inclination pattern P4, a paint is ejected from the nozzle 37 which is directed to the top surface portion of a convex portion, with a width of “t3” before and behind from the direction orthogonal to the top surface, thereby forming the inclination coating 27.

Figure 11A:
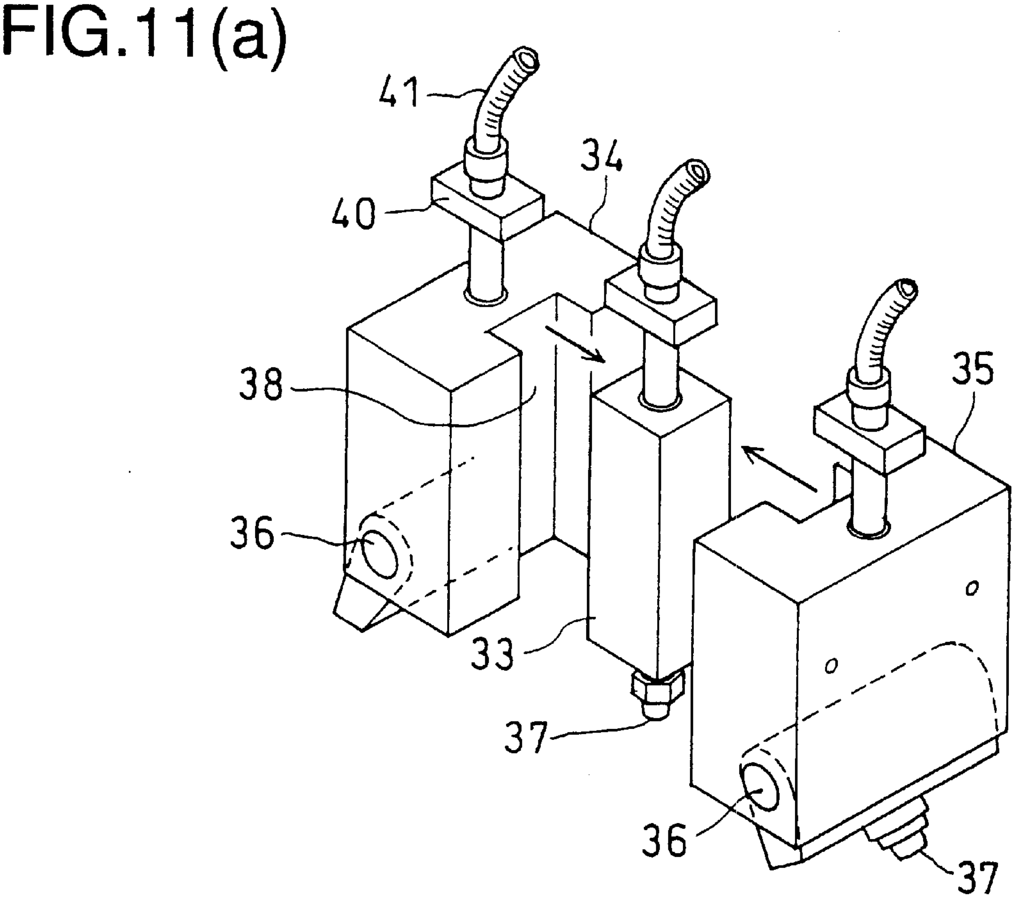
FIG. 11 is a perspective view of a spray gun which can be employed in a coating apparatus for a building panel of this invention, wherein FIG. 11(*a*) is an exploded perspective view of the spray gun and FIG. 11(*b*) is a perspective view of the spray gun assembled.
Figure 11B:
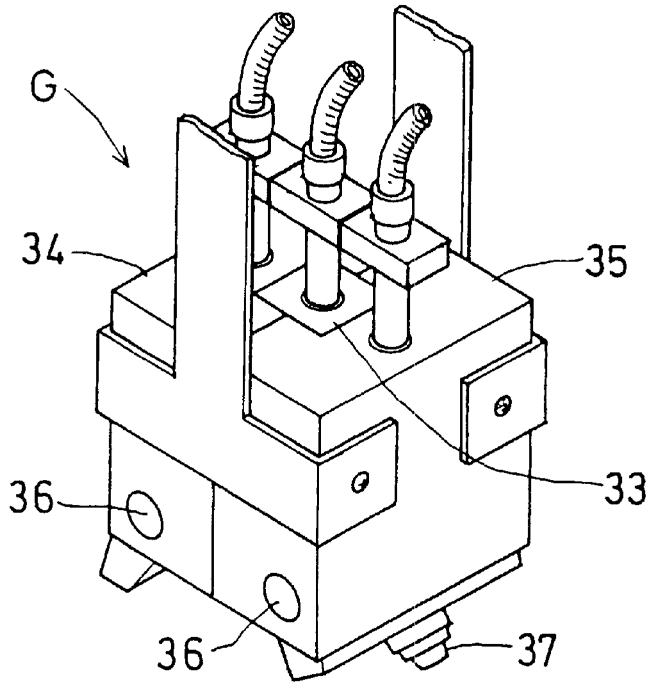

FIG. 11 shows one example of a spray gun unit which can be employed in a coating apparatus for a building panel of this invention.

As shown in FIG. 11(*a*), the spray gun unit is constituted by a triple structure comprising a central spray gun 33, a left spray gun 34 and a right spray gun 35.

The left and right guns 34 and 35 are provided respectively with a nozzle 37, the jet direction of which can be adjusted by an adjusting screw 36. The central gun 33 is provided with a nozzle 37, the jet direction of which is directed downward perpendicularly. A groove 38 is formed on the inner wall of each of the left and right guns 34 and 35 so as to be engaged with the central spray gun 33, thereby fabricating an integrated gun unit G as shown in FIG. 11(*b*).

Each of the spray guns 33, 34 and 35 is connected via a solenoid valve 40 with a flexible tube 41, which is in turn connected with a pump unit to be described hereinafter.

Figure 12A:
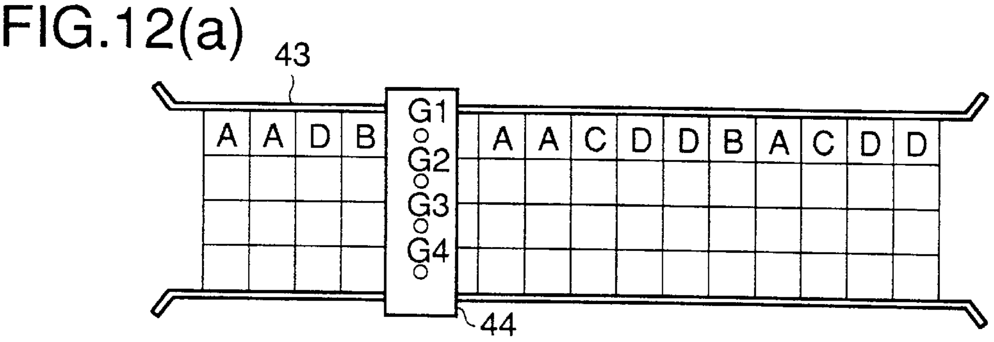
FIG. 12 shows block diagrams illustrating a method of controlling a spray coating based on area ratio patterns, wherein FIG. 12(*a*) is a plan view illustrating a manner of transferring a building panel, and FIG. 12(*b*) illustrates the system of a coating apparatus.
Figure 12B:
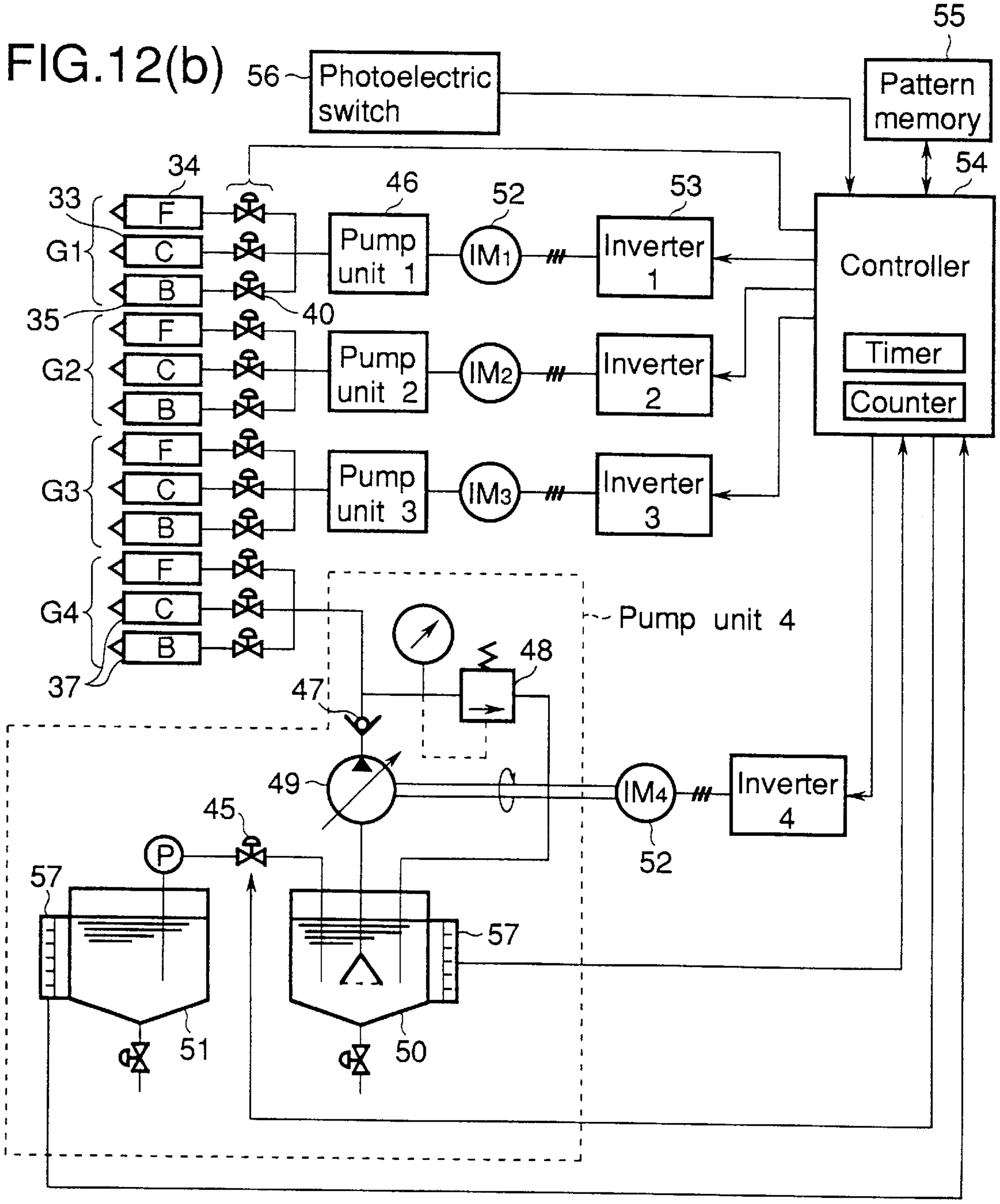

FIGS. 12(*a*) and 12(*b*) show a specific example of a controlled spray coating apparatus. Referring to FIG. 12(*a*), the building panel 1 is transferred along a guide 43 so as to be spray-coated by means of the gun units G1, G2, G3 and G4, wherein the jet rate of paint is varied according to the area ratio patterns A, B, C and D shown in FIG. 6.

FIG. 12(*b*) shows a specific example of a system configuration for performing the controlled spray coating. Each of four kinds of gun units G1, G2, G3 and G4 is constituted, as shown in FIG. 11, by the central spray gun (C) 33, a left spray gun (F) 34 and a right spray gun (B) 35 and connected via the solenoid valve 40 with the pump units (1 to 4) 46, respectively. As represented by the unit 4, the pump unit 46 comprises a check valve 47, a relief valve 48, a variable delivery pump 49, a paint tank 50 and a washing solution tank 51. In this system, the paint and washing solution are adapted to be fed to each of the gun units G1, G2, G3 and G4 by switching the solenoid valve 45.

Each pump unit 46 is connected with an induction motor 52 which is designed to actuate the variable delivery pump 49. Each induction motor 52 is connected via an inverter with a controller 54. The induction motor 52 and solenoid valves 40 and 45 are designed to be controlled by the controller 54. The controller 54 is provided with a timer and a counter, and connected with a pattern memory 55 which is adapted to memorize the aforementioned inclination patterns and area ratio patterns. The controller 54 is designed to be supplied with the signals from a photoelectric switch 56 which is capable of detecting the building panel in order to regulate the start and finish of the controlled coating, and with the liquid level-detecting signals from a sensor-attached liquid level indicator which is mounted on a paint tank 50 as well as on a washing solution tank 51.

Figure 13B:
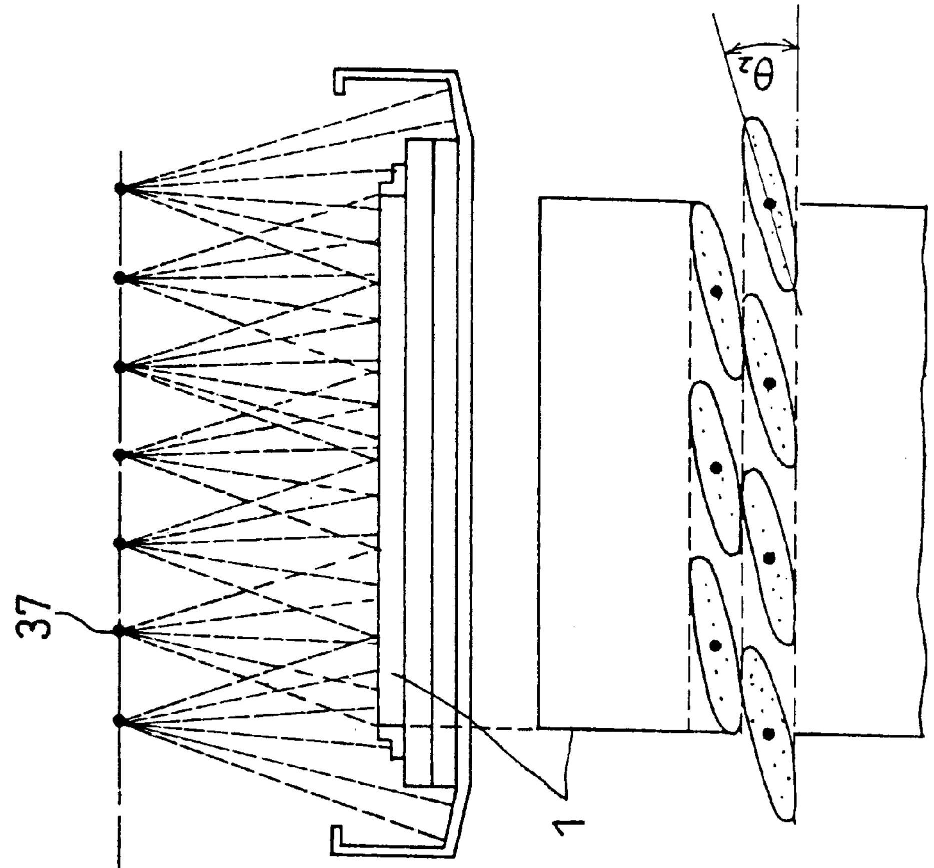
FIG. 13 shows diagrams, wherein both FIGS. 13(*a*) and 13(*b*) illustrate spray patterns in the crosswise direction of a building panel.
Figure 13A:
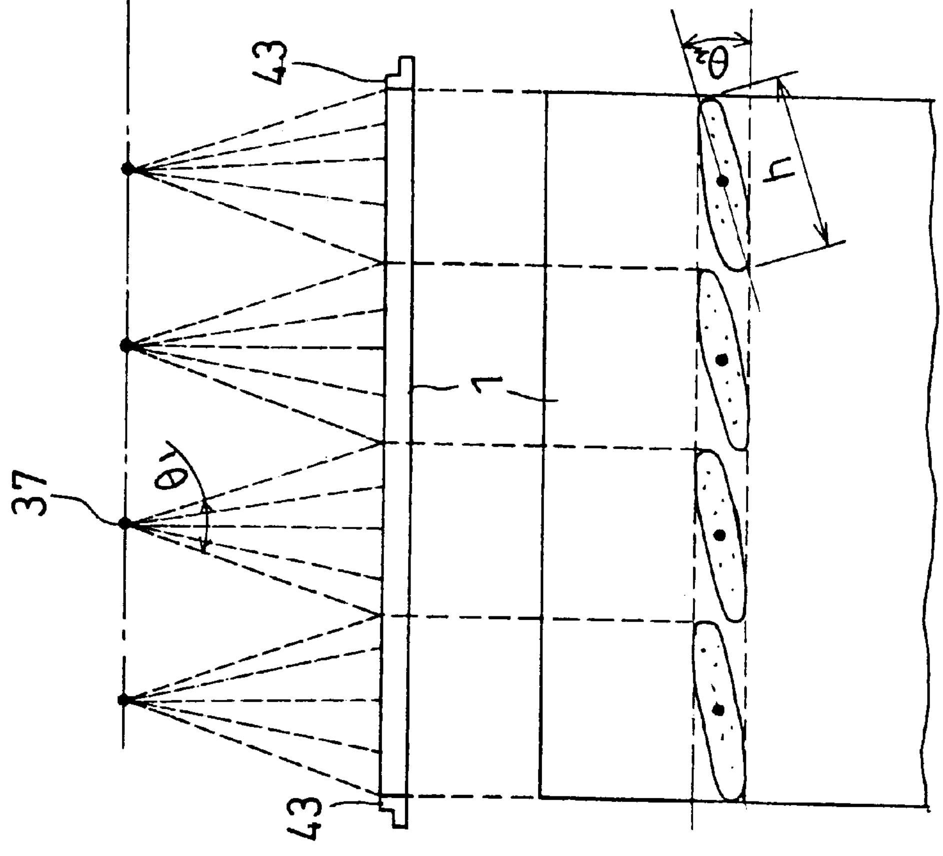

FIG. 13 shows examples of the arrangement of spray pattern in the crosswise direction of a building panel 1. Specifically, FIG. 13(*a*) shows an arrangement wherein a plurality of sector-shaped coating patterns (in side view) are equidistantly arrayed in a single row, each sector-shaped coating pattern being effected by the jet from a single nozzle 37 which is adapted to jet a coating material in a flat elliptical shape with θ1 in angle of divergence and h in standard spray width. FIG. 13(*b*) shows an arrangement wherein a plurality of sector-shaped coating patterns are arrayed in two rows, each row of sector-shaped coating patterns being constructed in the same manner as that shown in FIG. 13(*a*). In both arrangements of spray pattern, each spray pattern is arranged with a plane angle of θ2 so as not to interfere with the neighboring spray patterns.

Generally, as shown in the following formula, the quantity of paint to be discharged from a nozzle tip varies in proportion to the root of pressure and in inverse proportion to the root of the specific gravity of a paint.

Actual discharge $Q=Q0\times(P/P0\times S0/S)^{1/2}$(L/min)

P: Actual pressure (kg/cm$^2$) behind the nozzle tip

P0: Standard pressure (kg/cm$^2$)

S: Specific gravity of a paint

S0: Standard specific gravity of a paint

Accordingly, the discharging quantity of paint can be controlled by controlling the discharging pressure of paint, more specifically by controlling, through an inverter, of the rotational velocity of the induction motor 52 shown in FIG. 12. In this case, the discharging pressure of pump varies generally in proportion to the square of the rotational velocity of the motor.

Figure 14:
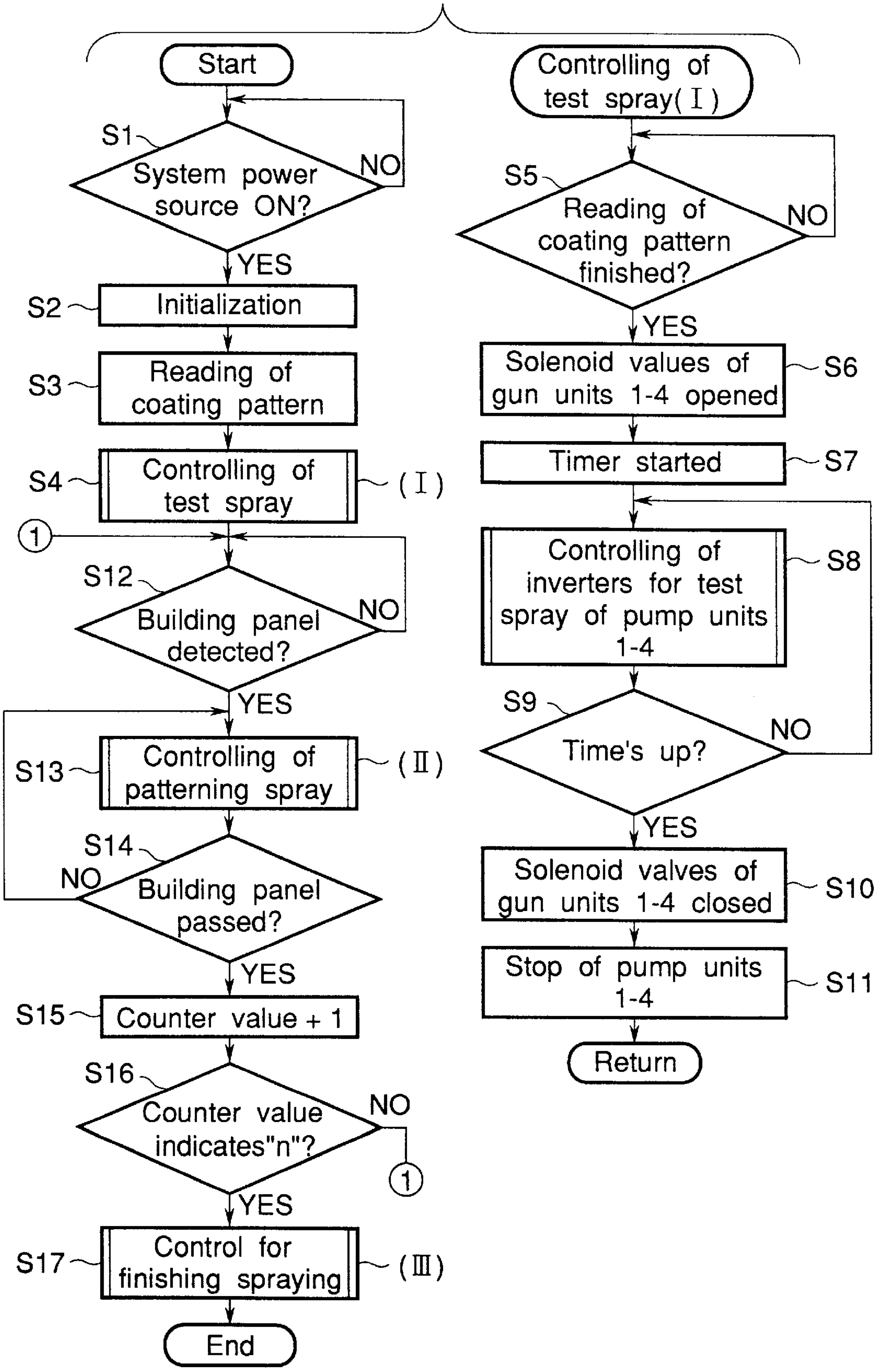
FIG. 14 is a flow chart of controlled spray coating.
Figure 15:
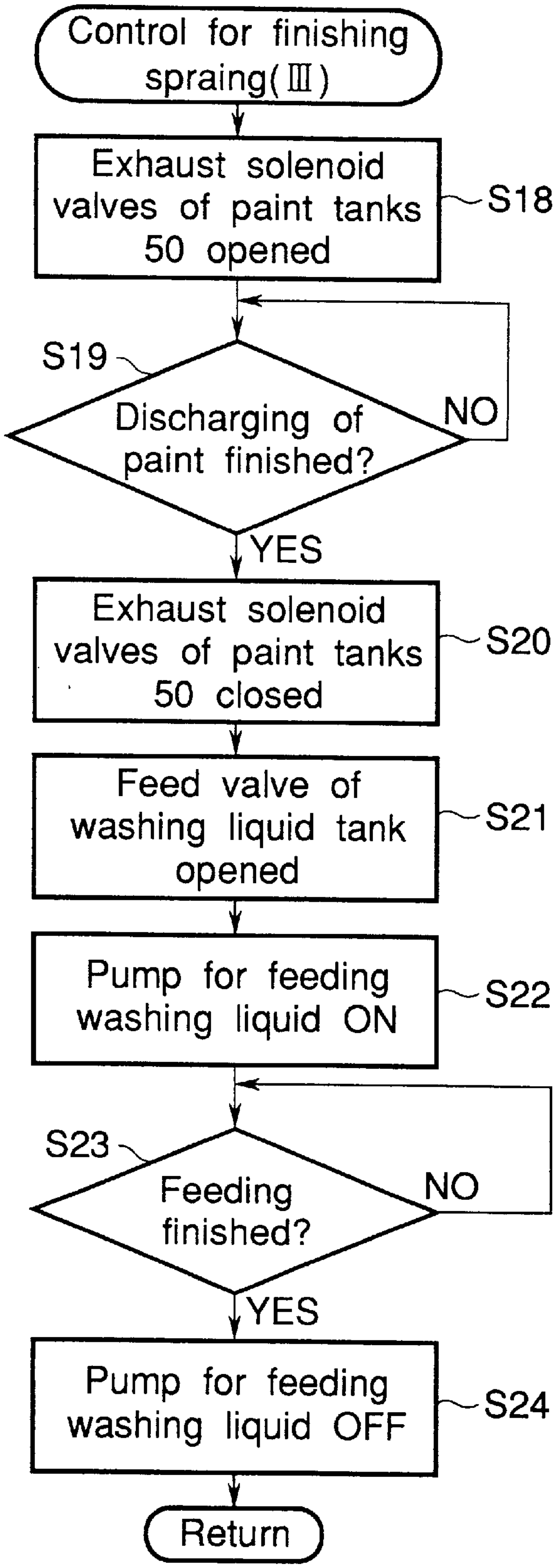
FIG. 15 is a flow chart of controlled spray coating.

FIGS. 14 and 15 respectively shows a flow of controlling the operation of the controller 54 shown in FIG. 12. First of all, the ON/OFF of a system power source is determined (S1). If the answer is YES, an initialization is performed (S1). But if the answer is NO, the initialization is not performed until the system power source is turned to ON. In the step S3, coating patterns are fed from the pattern memory 55 (see FIG. 12) to the controller 54. A controlling of test spray (I) is performed (S4). Namely, whether the reading of the coating patterns is finished or not is determined (S5) at first, and if the answer is YES, all of the solenoid valves 40 of the gun units G1, G2, G3 and G4 are opened (S6), and then the timer which is designed to count a predetermined time for a test is started (S7). Then, the controlling of the inverters (for test spray) 1 to 4 of the pump units 1 to 4 (46) is performed (S8). Then, whether the predetermined time for the test is over or not is determined (S9). If the answer is YES, all of the solenoid valves 40 of the gun units G1, G2, G3 and G4 are closed (S10), thereby suspend the operation of pump units 1 to 4 (S11). If the answer is NO in the step S9, the controlling of the inverters in the step S8 is continued until the time is up. Then, the detection of a building panel is determined by means of the photoelectric switch 56 (see FIG. 12) (S12). If the answer is YES, a controlling of patterning spray (II) is performed, but if the answer is NO, the controlling of patterning spray (II) is not performed until the building panel is detected.

Figures 16A, 16B:
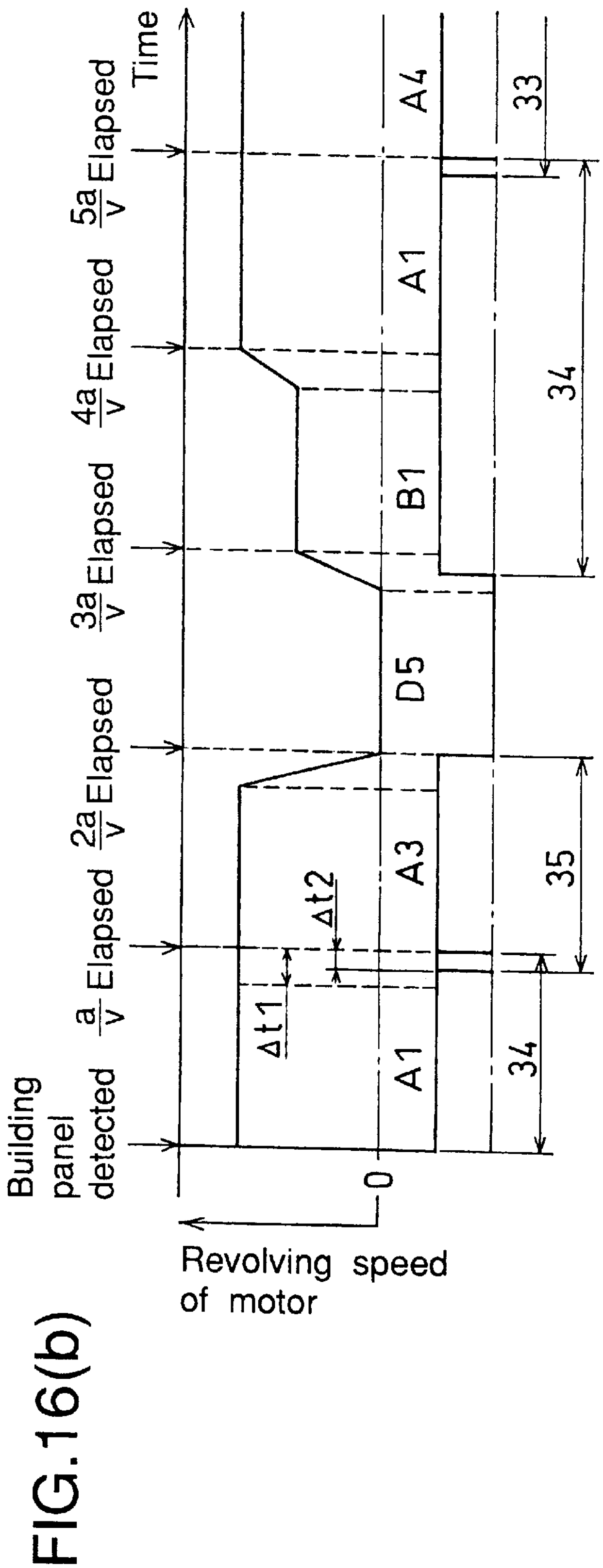
FIG. 16 shows diagrams illustrating the controlled spray coating shown in FIGS. 14 and 15, wherein FIG. 16(*a*) is an example of area ratio and inclination pattern data, and FIG. 16(*b*) is a time chart of directions to the gun unit.
Figure 17A:
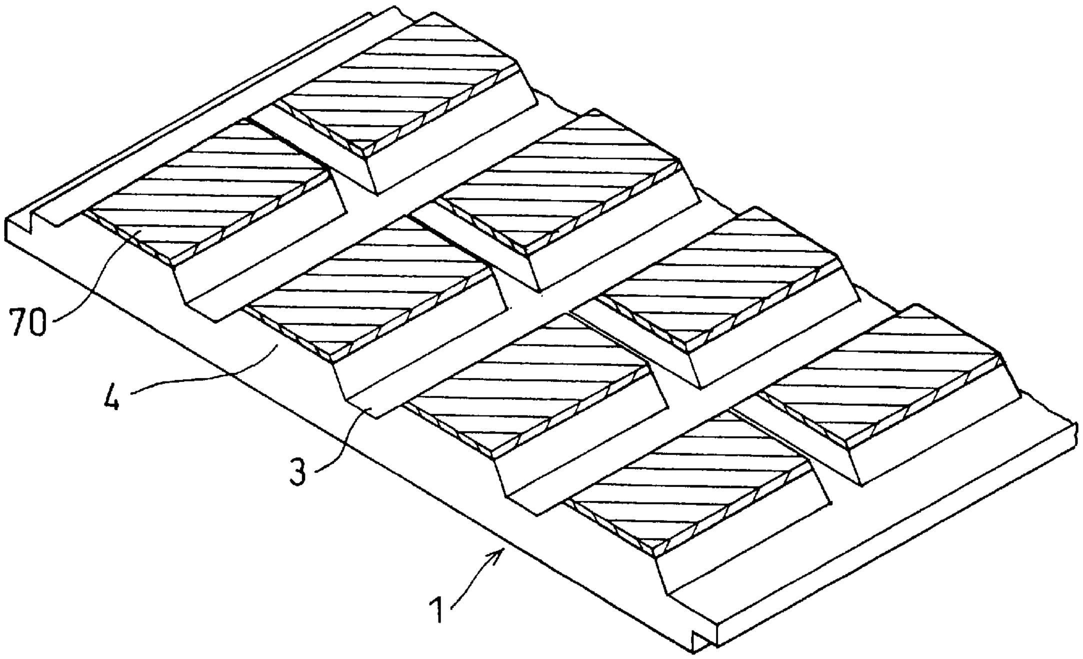
FIG. 17 is a building panel having a three-dimensional surface according to the prior art, wherein FIG. 17(*a*) is a perspective view thereof, and FIG. 17(*b*) is a cross-sectional view thereof.
Figure 17B:
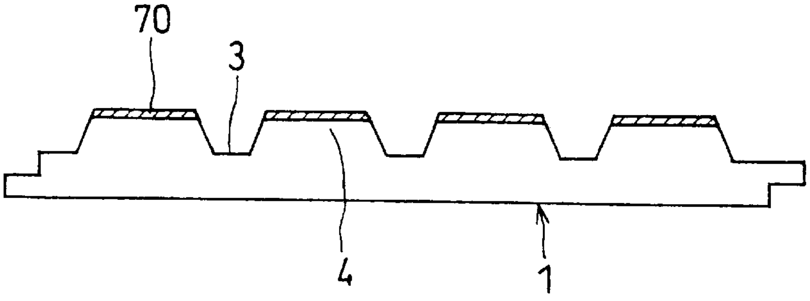

The controlling of patterning spray (II) is performed in accordance with the pattern shown in FIG. 16(*a*) and by determining the spray gun(s) to be employed out of three spray guns 33, 34 and 35 which constitute each of the gun units G1 to G4 so as to conform with the inclination patterns P1 to P5. Further, the quantity of paint discharged from a spray gun which has been determined to be employed as mentioned above is determined according to the area ratio patterns A, B, C and D.

For example, in the case of the spray gun G1, the sequence of the area ratio and inclination pattern in the longitudinal direction of the building panel, which are to be treated with the spray gun G1, would be such as shown in FIG. 16(*a*), i.e. (A1, A3, D5, - - - ). The sequence of these patterns is however further processed as indicated by the time chart shown in FIG. 16(*b*). Namely, with regard to the rotational velocity of motor which determines the quantity of paint to be discharged, the rotational velocity of motor is processed, for the purpose of avoiding an abrupt change in rotational velocity of motor, such that the time period of a given rotational velocity of motor is terminated slightly shorter than a predetermined cycle of the rotational velocity of motor (a/v; v is transferring speed (m/sec) of the building panel), e.g. by a time of Δt1, thereby permitting said given rotational velocity of motor to be gradually changed to the next rotational velocity of motor.

Further, the timing of operating the solenoid valves 40 for closing or opening the spray guns are processed as follows. Namely, when the spray gun to be employed is changed, the timing of operating the solenoid valves 40 is processed such that the discharge of paint from the next spray gun is initiated at the time slightly shorter than a predetermined cycle (a/v), e.g. by a time of Δt2, (namely, the ON time period of the solenoid valve of the next spray gun becomes a/v+Δt2).

Likewise, excluding at the occasion of the initial spraying, when the spraying is re-opened after a suspension of spraying, the timing of operating the solenoid valves 40 is processed such that the spraying by the solenoid valve is initiated at the time which is slightly shorter than a predetermined cycle (a/v), e.g. by a time of Δt2.

It is possible, with this additional processing of coating pattern that has been once determined, to avoid a time lag at the occasion of initiating the spraying and to realize a smoothly changed continuous coating without generating a blank of coating due to the switching of patterns.

With regard to the controlling of patterning spray (II) in step S13, whether the building panel has passed or not is determined by a photoelectric switch 56 in the next step S14. If the answer is NO, the controlling of patterning spray (II) is continued, and if the answer is YES, the controlling of patterning spray (II) is terminated and the counter value is increased by the number one (S15). Then, the counter value is checked to determine if it is equal to the number "n" of the building panels to be processed (S16). If the answer is YES, the control for finishing spraying (III) is performed (S17). If the answer is NO, the step S12 is restarted. The step of the control for finishing spraying (III) is performed as shown in FIG. 15. Namely, the exhaust solenoid valves of the paint tanks 50 (see FIG. 12) are opened (S18), and whether the discharge of paint is finished or not is determined by the liquid level sensor 57 (S19). If the answer is NO, the initiation of the next step is waited until the discharge of paint is finished. If the answer is YES indicating the finishing of discharge of paint, the exhaust solenoid valves of the paint tanks 50 are closed (S20), and washing solution-feeding solenoid valves 45 of the washing solution tank 51 for washing the piping system are opened (S21). Then, washing solution-feeding pump (see FIG. 12) is actuated (S22), and whether the feeding of the washing solution is finished or not is determined by the liquid level sensor 57 of the washing solution tank 51 (S23). If the answer is NO, the feeding of the washing solution is allowed to continue. If the answer is YES, the actuation of the washing solution-feeding pump is terminated (S24).

As mentioned above, it is possible according to the present invention to provide a building panel having a three-dimensionally patterned surface, which is enhanced in depth, in stereographic feeling and in natural external feeling, i.e. a building panel having outstanding features in design which the conventional art has failed to achieve. Furthermore, according to the apparatus of this invention, it is possible to perform a stereographic coating with high reproducibility and high stability, and to easily realize a specific stereographic coating in conformity with various patterns by simply changing the operation condition of the apparatus.

I claim:

1. A building panel having a three-dimensionally patterned surface comprising:

convex portions partially topcoated with a first coating;

concave portions partially topcoated with a second coating which is different in color from said first coating; and intermediate portions interposed between respective ones of said concave portions and said convex portions, said intermediate portions being topcoated with a third coating which is different in color from said first coating and from said second coating.

2. The building panel according to claim 1, wherein said third coating is darker in color than said first coating.

3. The building panel according to claim 1, wherein at least two kinds of grains, each differing in size, are distributed on said three-dimensionally patterned surface.

4. The building panel according to claim 2, wherein at least two kinds of grains, each differing in size, are distributed on said three-dimensionally patterned surface.

5. A method of applying a coating to a three-dimensionally patterned surface of a building panel comprising concave portions, convex portions, and intermediate portions interposed between respective ones of said concave and convex portions, said method comprising the steps of:

(a) entirely coating the three-dimensionally patterned surface with a first color;

(b) coating the convex portions with a second color which is different in color from the first coating while leaving the first color exposed on the concave portions; and (c) spray coating the intermediate portions with a third color which is different in color from the first coating and from the second coating while leaving the first color exposed on at least a portion of the concave portions and the second color exposed on at least a portion of the convex portions.

6. The method according to claim 5, wherein said step (c) is performed as the coating applied during said step (b) is in a semi-dried condition.

7. The method according to claim 6, further comprising, after said step (c), separately spreading at least two kinds of grains, each differing in size, on the three-dimensionally patterned surface.

8. The method according to claim 7, wherein said spreading step comprises spreading the smaller grains on the three-dimensionally patterned surface and thereafter spreading the larger grains on the three-dimensionally patterned surface.

9. The method according to claim 5, further comprising, after said step (c), separately spreading at least two kinds of grains, each differing in size, on the three-dimensionally patterned surface.

10. The method according to claim 9, wherein said spreading step comprises spreading the smaller grains on the three-dimensionally patterned surface and thereafter spreading the larger grains on the three-dimensionally patterned surface.

11. An apparatus for applying coating materials of different colors to a three-dimensionally patterned surface of a building panel, said surface having concave portions, convex portions, and intermediate portions interposed between respective ones of the concave and convex portions, said apparatus comprising:

a spray gun; and a controller for selecting a first coating material for partially topcoating the convex portions, a second coating material which is different in color from the first coating material for partially topcoating the concave portions, and a third coating material which is different in color from the first and second coating materials for topcoating the intermediate portions.

12. An apparatus for applying coating materials of different colors to a three-dimensionally patterned surface of a building panel, said surface having concave portions, convex portions, and intermediate portions interposed between respective ones of the concave and convex portions, said apparatus comprising:

a plurality of spray guns constructed and arranged to permit spraying of the coating materials in different directions from each other;

spray gun selection means for selecting from which of said spray guns the coating materials will be ejected based on which one of the concave, convex, and intermediate portions the three-dimensionally patterned surface is to be coated;

rate-determining means for determining the rate of the coating material to be ejected from said selected spray guns based on which one of the concave, convex, and intermediate portions the three-dimensionally patterned surface is to be coated; and coating means for coating the surface of the building panel at a rate determined based on which of said spray guns are selected.

13. The apparatus according to claim 12, further comprising means for partitioning the three-dimensionally patterned surface along longitudinal and crosswise directions to form a plurality of small sections having inclinations, wherein said spray gun selection means comprises inclination pattern-determining means for transforming the inclination of each of the small sections into an inclination pattern, and wherein said spray gun selecting means selects from which of said spray guns the coating materials will be ejected based on the inclination pattern determined by said inclination pattern-determining means.

14. The apparatus according to claim 12, further comprising means for partitioning the three-dimensionally patterned surface along longitudinal and crosswise directions to form a plurality of small sections having area ratios, wherein said rate-determining means comprises area ratio pattern-determining means for transforming the area ratio of said concave portions in each of the small sections into an area ratio pattern, and wherein said rate-determining means determines the let rate of coating material to be ejected based on the area ratio pattern determined by said area ratio pattern-determining means.

15. The apparatus of claim 13, wherein said inclination pattern-determining means determines the inclination pattern by scanning a selected one of the small sections with a predetermined number scanning lines along the longitudinal direction of the building panel and measuring a distance between a highest level among said convex portions to the surface of building panel.

16. The apparatus according to claim 14, wherein said area ratio pattern-determining means comprises:

an optical reader for scanning reduced two-dimensional black-and-white photographic images of the building panel and converting the scanned images into pixels, and image processing means for determining the number of black pixels representing the concave portions relative to the total number of pixels in a selected one of the small sections to thereby determine the area ratio pattern in the selected small section.

17. The apparatus according to claim 12, further comprising means for partitioning the three-dimensionally patterned surface along longitudinal and crosswise directions to form a plurality of small sections having inclinations and area ratios, wherein said coating means converts the inclination pattern and area ratio pattern into information representing changes in rate with time and changes in coating material-jetting time of the spray guns selected to be employed, and that the coating of said building panel by the coating means is carried out based on the information.

* * * * *